Sept. 8, 1931.  L. B. EHRLICH  1,822,342
FRAME STRUCTURE FOR DYNAMO ELECTRIC MACHINES
Filed June 4, 1928
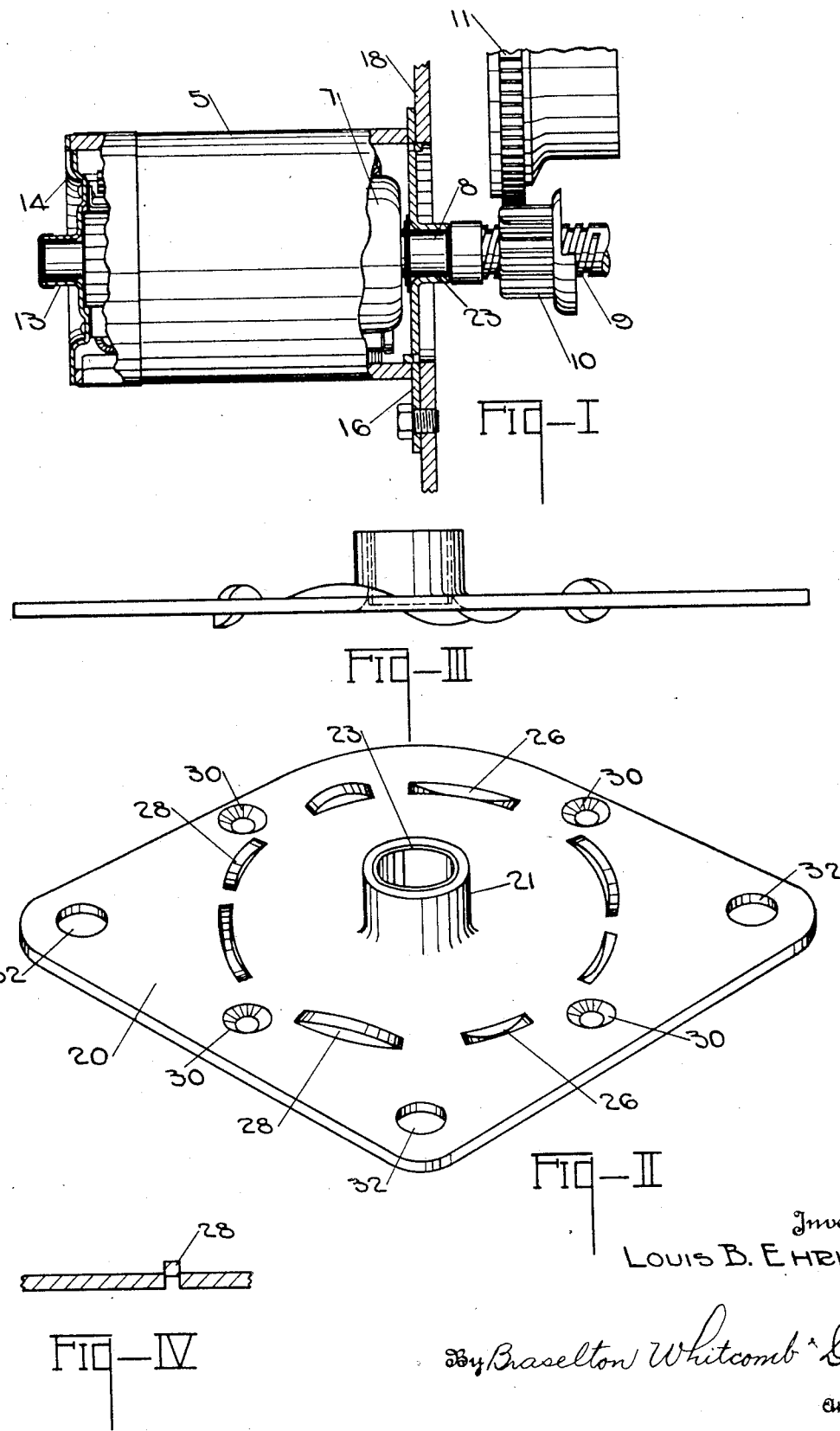
Inventor
LOUIS B. EHRLICH
By Baselton Whitcomb & Davis
Attorneys Patented Sept. 8, 1931

1,822,342

UNITED STATES PATENT OFFICE

LOUIS B. EHRLICH, OF TOLEDO, OHIO, ASSIGNOR TO THE ELECTRIC AUTO-LITE COMPANY, OF TOLEDO, OHIO, A CORPORATION OF OHIO

FRAME STRUCTURE FOR DYNAMO-ELECTRIC MACHINES

Application filed June 4, 1928. Serial No. 282,816.

This invention relates to dynamo-electric machines and more particularly to the end frame structure for those of the inclosed type such as are commonly employed as part of the electrical equipment of motor vehicles.

In the manufacture of dynamo-electric machines for use as starting motors and generators for automotive vehicles, it is a usual practice to accurately machine or finish the end frame of the motor or generator housing so that it may be accurately positioned with respect to its supporting member and cooperating mechanism. The end frames for dynamo-electric machines of this character have heretofore been made of cast iron or other suitable cast material which necessitates an expensive operation of finishing or machining the end frame so as to accurately fit the motor or generator housing and to hold the armature in proper spaced relationship with respect to its field structure.

It is one of the principal objects of this invention to provide a simple and improved end frame for a machine of this character which may be inexpensively manufactured in comparatively large quantities.

Another object of this invention is the provision of an end frame structure for dynamo-electric machine housings in which expensive and time consuming finishing operations have been eliminated.

Another object is the provision of a sheet metal end frame for a machine of this character in which a bearing support for the armature shaft of the machine is pressed or formed out of sheet material.

Another object is the provision of a sheet metal structure of this character which is provided with suitable locating and positioning means.

A further object is the provision of an end frame structure of this character having a hub portion and in which the locating and positioning means are formed out of the sheet metal structure.

A further object is the provision of a structure of this character which may be reversed for use with motor or generator housings of this type so as to permit a high degree of interchangeability of parts.

Still another object is to produce a sheet metal structure of this character which is provided with an integral hub portion forming a suitable bearing for a rotating element.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which Figure I is a side elevational view of a motor embodying my invention and showing the general arrangement of the parts;

Figure II is an enlarged isometric view showing a form of the end frame construction of my invention;

Figure III is a detail side elevational view of the frame structure shown in Figure II;

Figure IV is an enlarged fragmentary sectional view showing the formation of locating projections on the end frame construction of my invention.

Referring to the drawings in detail, I have shown the structure of my invention as incorporated in a starting motor for use in initiating the operation of an internal combustion engine, but it is to be understood that I contemplate the use of this structure wherever the same may be found to be applicable. The starting motor with which I have illustrated my invention comprises substantially a cylindrical housing 5 within which is revolvably supported an armature 7, an extension of the armature shaft 8 supporting a threaded portion 9 upon which is supported a starting pinion 10 which is adapted under certain conditions for enmeshment with a flywheel gear 11. The commutator end of the armature shaft is journalled in a bearing formed in a hub portion 13 of a combined end plate and brush supporting frame 14 which forms the subject matter of a separate application.

The other end of the housing is adapted to be enclosed by means of a plate 16 which forms a combined bearing support for the shaft 8, a closure for the end of the motor housing and a supporting member therefor adapted to be secured to a flange or web 18 forming a part of the internal combustion engine frame. Referring particularly to Figures II and III of the drawings the plate consists of a flat or body portion 20 which is formed with a centrally positioned hub portion 21 the bore of which is adapted to snugly receive a bushing 23 which forms a suitable bearing for the armature shaft 8. This bushing may be of any suitable material, but I have found that a bronze bushing lined with graphite serves the purpose very effectively.

It is imperative that a structure of this kind must positively retain the armature in a central position with respect to the field magnets of the machine in order to insure a constant and uniform pull upon the motor armature by the field magnets. If the bearing supporting the armature shaft is eccentric with respect to the radial distance of the field poles from the axis of the armature, the magnetic flux on one side is greater than upon the other. Furthermore, if an eccentric condition exists in a device of this character so that the armature is nearer one side of field magnets than it is another, the force exerted by the field magnets that are nearer to the armature will cause the bearing to be worn on one side.

In order to locate the end frame and bearing support properly with respect to the motor housing, I have provided a plurality of spaced projections 26 whose radial dimensions from the axis of the hub portion 21 are equal. These projections are struck up or formed out of the body of the plate 20 as particularly shown in Figure IV and form a suitable means for properly positioning and locating the end frame plate 20 with respect to the circular motor housing 5 however, it is to be understood that these projections may be formed independently of the end frame plate and secured thereto in any suitable manner.

As the radial dimensions of the walls of these projections to the axis of the hub portion 21 are all equal it is obvious that if the projections accurately fit the inner surface of the housing 5 that the armature shaft will necessarily be held in the central position with respect to the periphery of the housing 5.

The other side of the plate is provided with a similar series of spaced projections 28 and which form a similar locating means for properly positioning the plate with respect to a supporting structure 18. From examination of Figure III it will be seen that the projections extend outwardly from each face of the plate 20 and avoid the necessity of using a comparatively thick flanged plate, the flange of which must be accurately finished or machined which is an expensive and time consuming operation. This construction also effects a great saving in material. The plate 20 is provided with a plurality of counter-sunk openings 30 which are adapted to receive screws or other suitable holding means (not shown) for fixedly holding the plate to the housing 5 and a second series of openings 32 in the plate provides a suitable means for securing the latter to the supporting frame.

It is to be noted, as especially shown in Figure IV that the projections extend outwardly a distance slightly less than the thickness of the body of the plate so as to preclude the ingress of dust into the motor housing. In some installations of motors and generators it is desirable to reverse the plate with the hub portion projecting toward the armature. It will be apparent that the plate 20 may be easily reversed without necessitating material change in the plate.

It is apparent that, within the scope of the invention modifications and different arrangements may be made other than is herein disclosed, and the present disclosure is illustrative merely, the invention comprehending all variations thereof which can be carried out without departing from the spirit of the invention.

What I claim is:

1. In a device of the character described, in combination, a member supporting a hub; said member having a plurality of spaced arcuate projections radially disposed with respect to said hub forming locating means for said member.

2. In a device of the character described, in combination, a flat member formed of sheet material and having a hub portion, said member having a plurality of spaced struck up projections symmetrically and radially disposed with respect to said hub portion forming locating means for said member.

3. In a device of the character described, a member formed of sheet material having a plurality of arcuate projections extending laterally in opposite directions from said member and spaced symmetrically with respect to a common axis.

4. In a dynamo-electric machine a housing having an armature adapted for rototion therein, an end frame for the housing formed with a hub portion forming a bearing for the armature, said frame having a plurality of raised portions radially disposed with respect to the hub portion for properly positioning said frame with respect to said housing, and means independent of said raised portions for securing the frame in position.

5. In a dynamo-electric machine, the combination of a housing, an end structure for said housing comprising a member formed of sheet material, and a plurality of projections struck up from said member adapted for engagement with the housing and forming a mutilated flange for properly positioning the plate with respect to said housing.

6. In a dynamo-electric machine, a housing, a support for said housing, a sheet metal end frame structure interposed between said housing and support, said end frame having a plurality of spaced projections extending alternately in opposite directions for properly positioning the housing with respect to its support.

7. In a motor, the combination of a sheet metal end plate of irregular contour formed with a hollow hub portion, a bushing in said hub portion, and a plurality of spaced, arcuate portions struck up from the plate and extending in opposite directions therefrom, said projections being radially spaced from said hub portion.

8. In a device of the character described, the combination of a sheet metal end plate formed with a hollow hub portion, a bushing in said hub portion, and a plurality of spaced, raised portions struck up from the plate and extending in opposite directions therefrom, said projections being spaced from said hub portions, the projections upon each face of said plate being equally distant from the axis of said hub portion.

9. In a device of the character disclosed, in combination, a plate supporting a hub member, said plate having a plurality of spaced struck up projections spaced symmetrically with respect to said hub member, said projections terminating in the plane of said plate and having the side walls lying in substantially parallel planes.

10. In a device of the character disclosed, in combination, a plate; means formed out of said plate for locating the latter with respect to a member, said means comprising a struck up portion, the side walls of said portion lying in substantially parallel planes.

11. In a device of the character disclosed, in combination, a plate; means formed out of said plate for locating the latter with respect to a member, said means comprising arcuate struck up portions whose extremities terminate in the plane of said plate, and whose side walls lie in substantially parallel planes.

In testimony whereof, I affix my signature.

LOUIS B. EHRLICH.